United States Patent [19]

Levy

[11] Patent Number: 4,837,876
[45] Date of Patent: Jun. 13, 1989

[54] ROCK 'N WALKER

[76] Inventor: Reuven Levy, U.S. Rt. 11, Box 25, Brushton, N.Y. 12916

[21] Appl. No.: 202,706

[22] Filed: Jun. 6, 1988

[51] Int. Cl.$^4$ .............................................. A47D 9/02
[52] U.S. Cl. .......................................... 5/107; 5/109; 128/33; 180/166
[58] Field of Search ................. 5/105, 106, 107, 108, 5/109; 180/166; 128/33

[56] References Cited

U.S. PATENT DOCUMENTS

| | | | |
|---|---|---|---|
| 2,689,355 | 9/1954 | DeFrank | 5/109 |
| 3,820,614 | 6/1974 | Askinazy | 180/166 |
| 3,886,608 | 6/1975 | Casella | 5/109 X |

FOREIGN PATENT DOCUMENTS 03108  6/1986  Int'l Pat. Institute ................. 5/109

Primary Examiner—Gary L. Smith
Assistant Examiner—Michael J. Milano

[57] ABSTRACT

The Rock 'N Walker is a device which automatically turns the wheels of a baby carriage or hospital infant bed, and can be built to fit under the front (or rear) wheels of any size axle or wheel base. It can be made of heavy duty, non-brittle plastic, fiberglass, or wood; however, the rod and bolts on which the rollers turn should be made of metal for durability.

5 Claims, 1 Drawing Sheet

ROCK 'N WALKER

SUMMARY OF INVENTION:

The Rock 'N Walker is a device used to help cranky, crying babies rest contently or get to sleep. The unit is comprised of a holder in which there are two rollers, one free-turning roller guide cylinder and the other rotatable roller powered by a small electric motor coupled to a gear box. The device could include a voice-activated turn-on feature, a speed control to regulate the strength of the motion, and a timer to enable automatic shut-off. Except for the motor and the bolts on which the rollers turn, the unit can be made of heavy-duty, non-brittle plastic, or fiberglass, or any other combination of hard, durable substances which are lightweight and economical.

The dimensions are quite flexible, and can be tailored to fit any size axle or wheel base. For purposes of the working model which was made to fit standard baby carriages and hospital baby beds, the Rock 'N Walker is rectangular shaped (see the accompanying drawing), approximately 32 inches long, 12 inches wide, and 6 inches high.

When the front (or rear) wheels of a baby carriage or wheeled hospital infant bed are placed atop the motorized roller, leaning into the space between the two roller, once the Rock 'N Walker. is turned on the perforations (or slits) in the powered roller will turn the wheels of the carriage or bed, effecting a walking and rocking sensation. The inclusion of a voice-activated turn-on, a timer, and a speed control button would amplify the practical use of the Rock 'N Walker.

Field of the Invention: In situations where a person does not have the time, the ability, or the energy to actually take a baby out for a walk to soothe him (or her), or cannot rock the baby's carriage or wheeled bed, the Rock 'N Walker will do it automatically. For example, in many hospital nurseries with newborn babies and in many day care centers, there are not enough nurses and staff to attend to all the babies crying at once; rather than endure a situation in which young infants are crying for extended periods of time, waiting for someone to come and soothe them, a nurse or staff person can place the wheels of an infant's bed atop the Rock 'N Walker, plug it in, and the walking/rocking motion will soothe the baby to quiet and sleep. Each bed or carriage can have its own Rock 'N Walker unit under its wheels so that an unlimited number of babies can be soothed simultaneously. Or, if both parents work, have been awake with their baby for a number of consecutive nights, and are at the point of exhaustion, they can put baby in a carriage by their bed, set the carriage's front (or rear) wheels atop the Rock 'N Walker, plug it in, and baby will feel like he (or she) is out for a stroll; being sweetly rocked and walked, baby will stop crying and fall asleep, affording the parents the rest that they so desperately need.

DETAILED DESCRIPTION OF INVENTION:

The Rock 'N Walker is a device which can save parents, nurses, and day care personnel some of the extensive time and energy needed to walk and soothe cranky, crying babies, from newborn infants to toddlers. The Rock 'N Walker is particularly useful in situations where many babies would be crying at once, and limited staff is available to tend them (such as hospital newborn nurseries, day care centers, etc.); the Rock 'N Walker would also be invaluable to families in which the parents work and cannot spend sleepless nights with their crying babies on a continuous basis.

The Rock 'N Walker will automatically turn the wheels of a baby carriage or hospital newborn infant bed, so that the baby will feel as though he (or she) is being taken for a walk and/or is being rocked. This feeling has consistently been shown to be very soothing to a baby, and helps the baby to stop crying and fall asleep.

Figure 1:
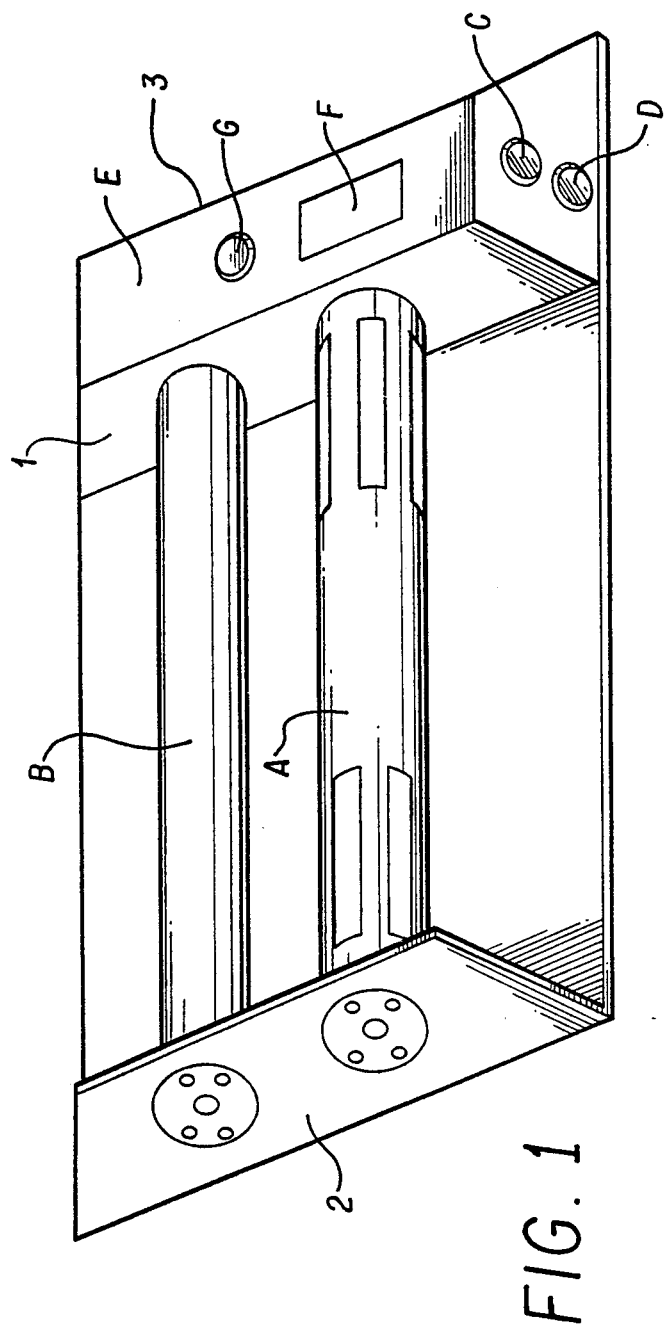
FIG. 1 depicts the essence of the invention, namely, the motor-powered roller A with slits, or cut-out (i.e. perforated) sections in alternating positions on each side of the roller.

The enclosed drawing shows the basic design of the Rock 'N Walker, stripped of all possible cosmetic embellishments. FIG. 1 depicts the essence of the invention, namely, the motor-powered roller A with slits, or cut-out (i.e. perforated) sections in alternating positions on each side of the roller, separated by a small space (approximately 2½ inches) from the freely turning roller B, and contained in a compact, lightweight box-type holder which also houses in area E a motor, gear-box, and on/off switch (button G); including a voice-activated start unit (F), a speed control (D), and a timer (C) is useful, and existing versions of these devices would be incorporated into the Rock 'N Walker.

Figure 2:
FIG. 2 shows an alternate roller design, with a ridged octagonal cylinder instead of a slitted tube.

The length, width, and height of the Rock 'N Walker indicated in the drawing merely illustrate a convenient, standard size. However, the Rock 'N Walker can be built to any dimension that is needed for specific axle or wheel sizes. FIG. 2 shows an alternate roller design (H) with a ridged octagonal cylinder instead of a slitted tube.

Manner of Construction: Below is detailed a simple way of constructing the Rock 'N Walker, very similar to the method used in making the working model. However, the following method is by no means the only way to make the device. Obviously, materials that were ready-to-hand and economical were chosen for the model. Other materials (such as durable fiberglass instead of plastic) or other shapes (such as an elongated trapezoid instead of an open rectangular box) might be preferred in mass production for cosmetic purposes, economy, availability, etc. Moreover, the dimensions chosen for the model described below were those that conformed to standard baby carriages and hospital newborn beds. In actuality, any dimensions needed for a particular push-type wheeled vehicle can be accommodated.

The working model can be built as follows (refer to FIG. 1): (1) Construct an open, rectangular holder consisting of a base and two sides, made of ¾ inch wood or heavy duty plastic. The dimensions are 32 inches long by 12 inches wide by 6 inches high. The base of the holder is 32 inches long by 12 inches wide, and the two 5 inch high pieces are attached to the base on the 12 inch sides, to form Sides II and III (labeled 2 and 3 on the enclosed drawing). A partition is then attached to the base, also made of ¾ inch wood or heavy duty plastic, the same size as the two sides (12×6) to make Side I (labeled 1 on the enclosed drawing). This partition, Side I, divides the holder into two sections: one is approximately 26 inches long, and the other 6 inches long. A wedging strip can be attached at the inner base seams along sides I, II, and III for extra support.

(2) Drill out four holes of approximately ¼ inch diameter, two of them in Side I and two in Side II (namely, in the partition and in the external side of the large compartment). Each hole should be approximately 3 inches up from the base of the holder, and 3 inches in from the lateral edges of the sides. The two holes in each side are approx. 8¾ inches apart.

(3) Take 4 round metal plates, about 1½ inches in diameter, and drill out a hole about ¼ inch diameter in the center of each plate. Attach one plate (by means of screws or bolts) around each of the four holes drilled in Sides I and II; the hole in the center of each plate should be lined up with the holes in the side where the plate is being fastened, and the plates should be fastened on the sides' surfaces which are outside the large compartment. The purpose of these plates is to provide strength and support to the weight-bearing rollers.

(4) Obtain a small, quiet standard electric motor which runs on the available current (in this case, 120 volt household current), and connect it to a small gear box. Place the motor and gear box inside the holder's small compartment and insert the rotor through the nearest hole in Side I. The rotor should protrude about 12 inches into the large compartment; attach an extender if necessary. The entire 12 inch shaft of the rotor within the large compartment should be fitted with a metal sheath whose outer surface is hexagonal. A square-surfaced sheath is acceptable, but a hexagonal one will provide a more secure turning mechanism.

(5) Get two tubes made of heavy duty, rigid, non-brittle plastic, about 3½ inches in inner diameter and about 25 inches long (i.e. slightly shorter than the inside of the large compartment). Around one tube, starting approx. one inch in from each edge, cut out 5 perforations or slits; each slit should be about 7 inches long by 1 inch wide, and the slits are about 1 1/5 inches apart around the circumference. Important: the 5 slits at each end of the tube should NOT be directly opposite each other; on the contrary, a slit at one end should be opposite a solid area on the other end. In other words, the slits at each end of the tube are cut in alternating apposition to each other, as shown on Roller A in the enclosed drawing.

This manner of cutting the slits is essential, since this is what creates the the side-to-side rocking motion; the "walking" sensation is created when each wheel is turned from one slit to the other on the same end of Roller A. The slitted or "perforated" tube which has just been made and identified as Roller A of the enclosed drawing is used as the powered roller, which will be attached to the motor; the other tube (without slits) is Roller B. FIG. 2 shows an alternate design of Roller A, octagonal in shape with ridges instead of slits to "bump" the wheels.

(6) Make 5 cylindrical-shaped pieces of hardwood, with a diameter of about 3½ inches. Three of these pieces should each be 4 inches long, and two pieces are one inch long each. Through the center core of one 4-inch piece and one 1-inch piece, cut a hexagonal hole (or a square hole, if a square sheath was used on the rotor in step 4); the inner dimensions of the hexagonal hole must conform to the perimeter of the rotor's hexagonal sheath, to ensure a perfect, tight fit with no slippage.

Spread an ultra-heavy duty permanent bonding epoxy on the inner surface of Roller A, starting from the end of one set of slits facing the center of the roller, and covering a solid area extending from the end of the slits 4 inches toward the roller's center. Insert into the roller the 4-inch long wooden cylinder with the hexagonal hole, pressing it down past the slits onto the glued area. The lower edge of the wooden cylinder should end up about 12 inches down into the roller, with the upper edge 8 inches down, ending just short of the slitted area. At the end of Roller A which is 8 inches up from the the cylinder just inserted, spread the same epoxy over the inner surface starting at the edge and going in 1 inch. Take the 1-inch wooden cylinder with the hexagonal hole and tamp it down into the glued end of the roller, making sure that the outer surface of the cylinder is flush with the end of the roller. Important: Make sure that the angles of the hexagonal hole of the 1-inch wooden cylinder just inserted line up perfectly with the hole in the 4-inch piece already in place.

Now spread epoxy over the inner surface of the opposite end of Roller A, again over a 1-inch area from the roller's edge inwards. Take the other 1-inch wooden cylinder (without a hole) and tamp it down into the roller, again making sure that both edges are flush.

At this point, a slitted roller containing a 1-inch wooden cylinder pierced by a hexagonal hole at one end, a 4-inch

I claim:

1. A motion producing device for imparting motion to a wheeled baby carriage or hospital baby bed, the device comprising:

a rectangular holder having rotatable roller means mounted thereon to rotate the wheels of the baby carriage or hospital bed;

a rotatable guide cylinder mounted on the holder substantially parallel to the rotatable roller means biasing the wheels into the means for rotating;

means for rocking and oscillating the bed or carriage; said rocking and oscillating means forming part of the roller means, the rocking and oscillating means being in the form of plural slits located at opposite ends of the roller, the slits at one end of the roller being staggered relative to the slits at the opposite end; means for imparting rotary motion to the rotatable roller means, control means for controlling the rotation of the rotary motion means; whereby the device can be used to produce a simulated rocking and walking motion to help cranky, crying babies rest contently or get to sleep.

2. The device of claim 1 further comprising a voice actuated start mechanism.

3. The device of claim 1 further comprising a speed control mechanism.

4. The device of claim 1 further comprising a timer mechanism.

5. The device of claim 1 comprising an octagonal shaped roller.

* * * * *